March 13, 1973  C. J. KULANDER  3,720,392
VIBRATION-DAMPENING DEVICE FOR A FLOOR-MOUNTED
VIBRATING MECHANISM
Filed April 30, 1971  4 Sheets-Sheet 1
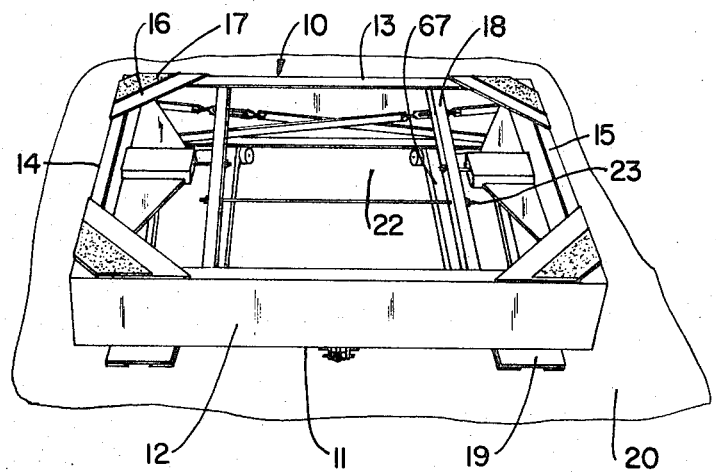
FIG_1
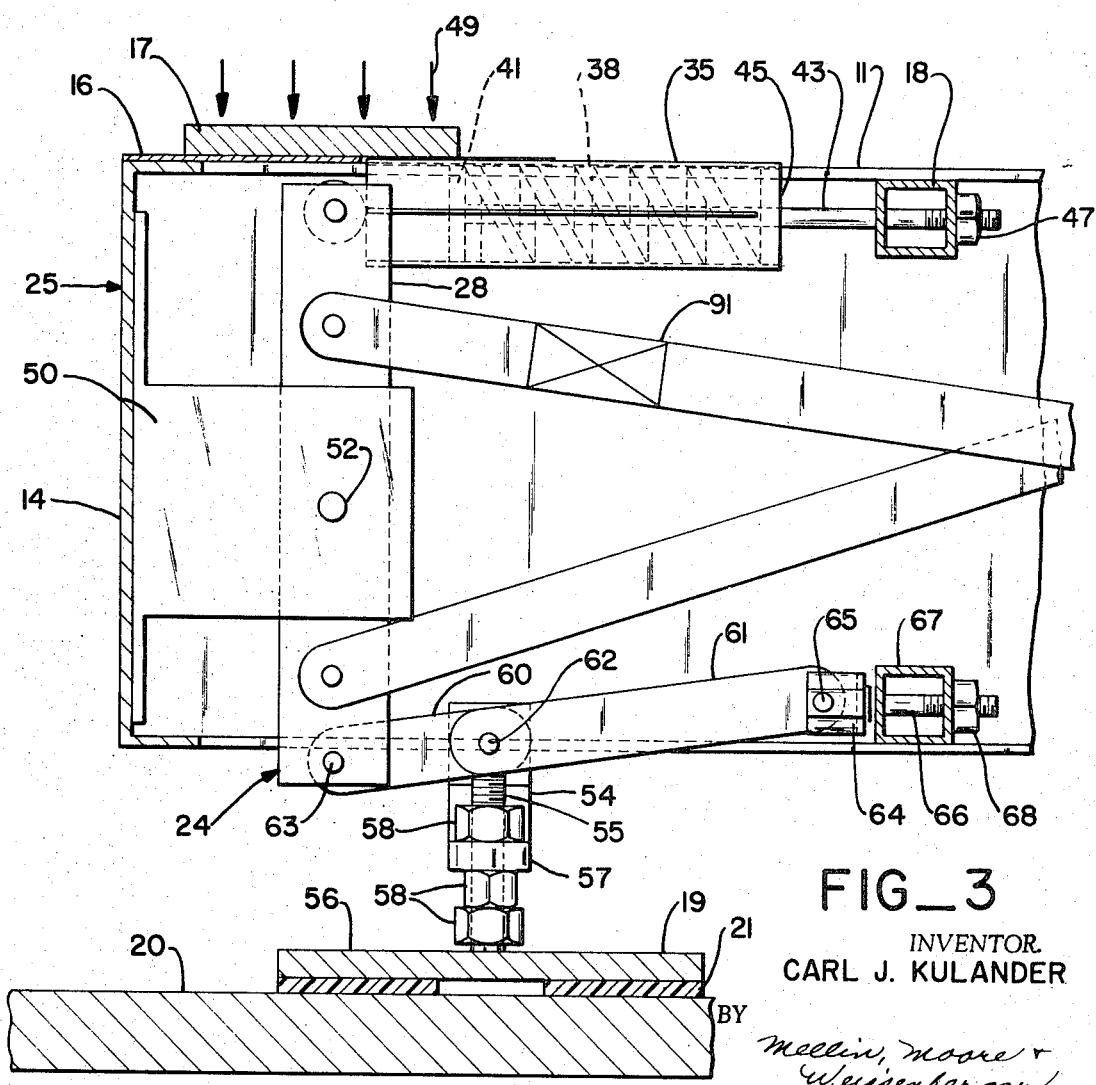
FIG_3
INVENTOR.
CARL J. KULANDER
BY
Mellin, Moore &
Weisenberger
ATTORNEYS

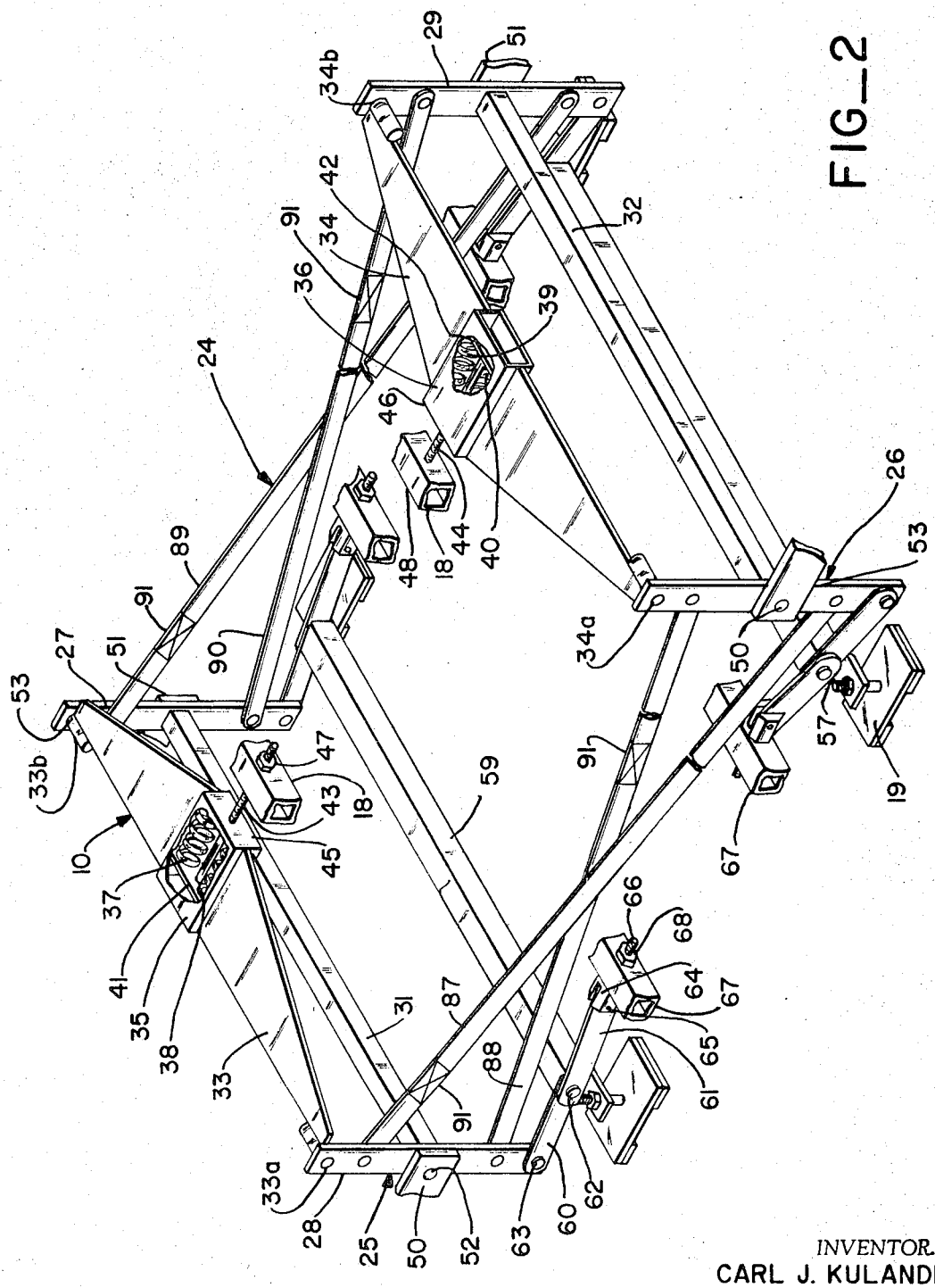

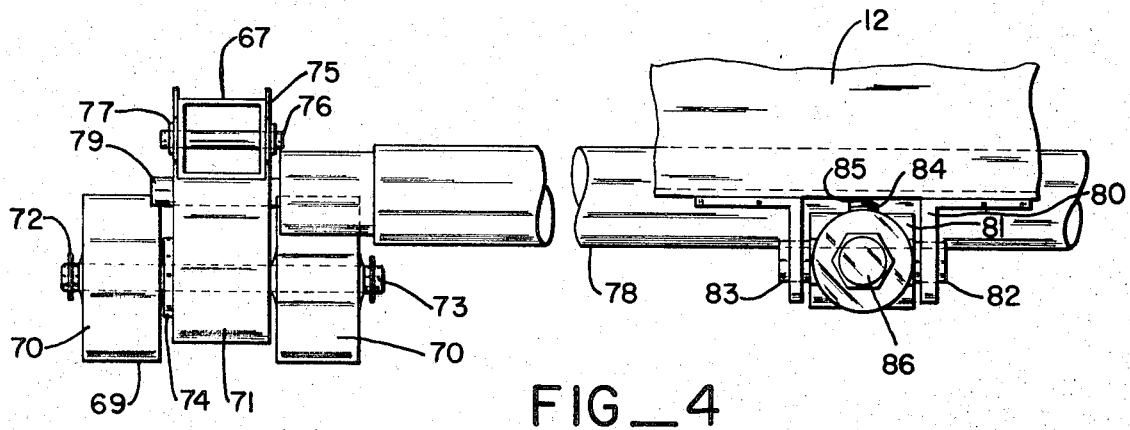
FIG_4
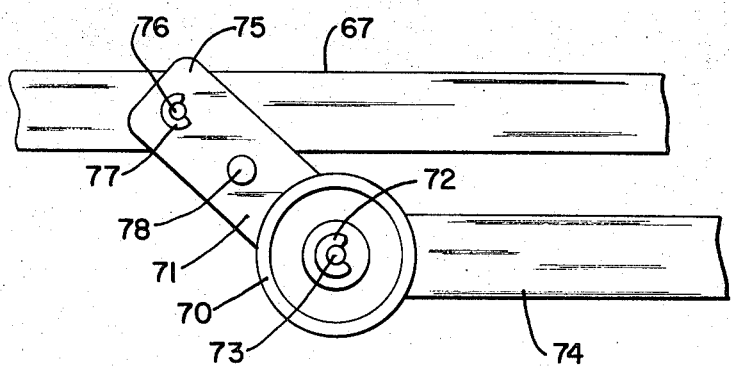
FIG_5
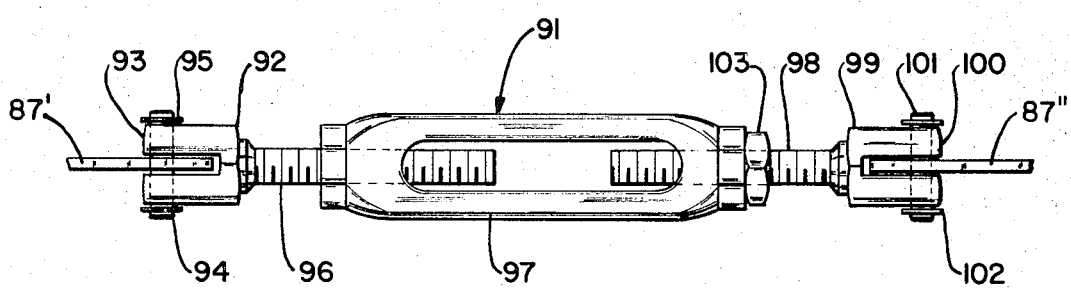
FIG_6
INVENTOR.
CARL J. KULANDER
BY
Mellin, Moore + Weissenberger
ATTORNEYS

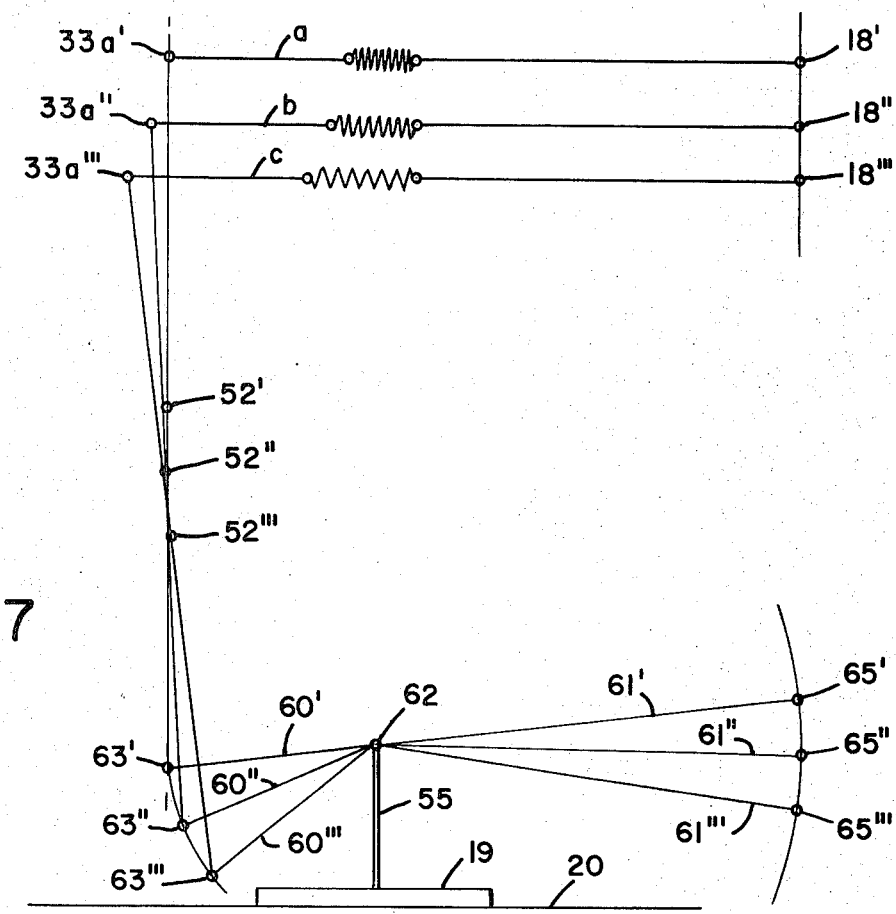
FIG_7
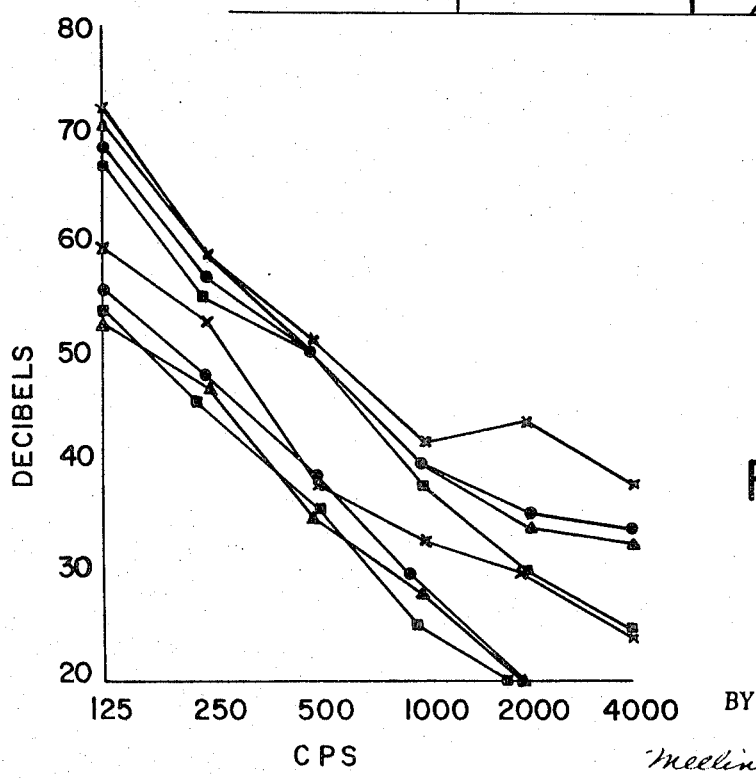
FIG_8

United States Patent Office 3,720,392
Patented Mar. 13, 1973

3,720,392
VIBRATION-DAMPENING DEVICE FOR A FLOOR-MOUNTED VIBRATING MECHANISM
Carl J. Kulander, P.O. Box 2144, Concord, Calif. 94521
Filed Apr. 30, 1971, Ser. No. 138,958
Int. Cl. F16f 15/06
U.S. Cl. 248—20
10 Claims

ABSTRACT OF THE DISCLOSURE

A vibration-dampening device for a floor-mounted vibrating mechanism is provided including an outer frame member adapted to rest on the floor and support the vibrating mechanism thereon. The device includes an inner leveling vibration and impact shock-absorbing mechanism for absorbing vibration and impact on the frame member. Means are provided for transmitting vibration from the vibrating mechanism mounted on the frame member to the shock-absorbing mechanism.

BACKGROUND OF THE INVENTION

(1) Field of the invention

The invention relates to vibration-dampening devices; and, more particularly, to a floor-mounted device for absorbing vibrations from a vibrating mechanism mounted thereon.

(2) Description of the prior art

The increased popularity of certain home appliances, such as washers and dryers, has resulted in the installation of many of these devices in areas in which noise and vibration caused by such appliances are undesirable. For example, many such appliances are presently installed or being installed in town houses, apartments and the like where the proximity to adjacent neighbors, i.e., next to, above and below the user of such appliances, results in undesirable noise and vibration.

In order to combat these problems, most appliances which produce such noise and vibration include built-in vibration-dampening features. However, in practice, it has been found that such features generally do not result in a satisfactory reduction in both the noise level and vibration caused thereby. This is particularly true where appliances are used that result in varying phases of noise and vibration. For example, one commercial appliance that is currently popular in apartment installation is a combination washer and dryer—that is, the washing portion and the drying portion is an integral unit, not a separate washer and a separate dryer mounted together. When such washer-dryer combinations are mounted in an upper apartment, for example, by setting it directly on the floor (that is, conventional installation as recommended by the manufacturer), the noise level in the lower apartment is loud enough to be heard clearly in all rooms of the lower apartment. Such noise is obviously objectionable, resulting in constant complaints to the apartment management, thus making the installation of such devices a problem under certain conditions. However, the compactness of such appliances and their relatively low cost—particularly in apartments in which it is desirable that each unit have its own washer and dryer—makes these units very desirable in spite of the general objections to their noise and vibration.

Accordingly, there exists a need for a vibration-dampening device upon which such appliances can be readily and quickly mounted in order to reduce and even substantially eliminate such undesirable features. Such a device must also be relatively inexpensive and compact so that it would not significantly increase the cost of installation of such appliances. Finally, such a device should be usable with any type of vibratory appliance—e.g., a washer or dryer alone—although it should be particularly suited to appliances which involve different vibratory cycles—e.g., as washer-dryer combinations which have one type for the washer portion and one for the dryer portion.

SUMMARY OF THE INVENTION

It is an object of this invention to provide a vibration-dampening device that can be used with various types of vibratory mechanisms, such as home appliances, to reduce the amount of noise and vibration caused by such mechanisms.

It is a further object of this invention to provide such a device that is relatively inexpensive and can be quickly and easily installed under such vibratory mechanisms.

It is a still further object of this invention to provide such a device that is particularly suited for use with a combination washer and dryer wherein varying vibratory cycles are found.

These and other objects are preferably accomplished by providing an outer frame member which is adapted to rest on the floor and support a vibrating mechanism thereon. The device includes an inner leveling vibration and impact shock-absorbing mechanism for absorbing vibration and impact on the frame member. Means are provided for transmitting vibration from the vibrating mechanism mounted on the frame member to the shock-absorbing mechanism.

BRIEF DESCRIPTION OF THE DRAWINGS

FIG. 1 is an isometric view of the vibration-dampening device in accordance with my invention;

FIG. 2 is an isometric view of the internal mechanism of the device of FIG. 1;

FIG. 3 is a vertical, partly sectional, view of the device of FIG. 1 with parts thereof omitted for convenience of illustration;

FIG. 4 is a detailed view of a portion of the device of FIG. 1;

FIG. 5 is a side view of the detailed view of FIG. 4;

FIG. 6 is a detailed view of another portion of the device of FIG. 1 (also shown schematically in FIGS. 2 and 3);

FIG. 7 is a schematic illustration showing the various forces acting on my device when supporting a vibrating mechanism thereon; and FIG. 8 is a graphical illustration showing the reduction of noise using my device over conventional installation.

DESCRIPTION OF THE PREFERRED EMBODIMENT

Referring now to the drawings, a vibration-dampening device 10 in accordance with my invention is shown. Device 10 includes a generally rectangular outer frame member 11. Of course, frame member 11 may be any suitable configuration sufficient to support a vibrating mechanism thereon. In other words, the configuration of frame member 11 is generally related to the base of the mechanism it is desired to support.

Thus, frame member 11 may include a pair of elongated sides 12 and 13 joined to a pair of shorter elongated sides 14 and 15 in the manner illustrated. Brace members 16 may be disposed at the intersection of sides 12 through 15 if desired. Each brace member 16 may have a friction-reducing pad 17 mounted thereon so that slippage between the device 10 and the mechanism to be supported thereon is reduced.

Upper cross braces 18 preferably extend between sides 12 and 13, the particular number and location of such braces being a matter of choice. As can be best seen in FIGS. 2 and 3, support legs 19 are disposed at each corner of frame member 11 (however, the legs 19 are not mounted on the frame member 11, as will be discussed hereinbelow). These legs 19 are of course adapted to rest on floor 20 as shown and may include rubber pads 21 or the like (FIG. 3) for preventing sliding of the device 10 and abrasion on floor 20.

The cross braces 18 (FIG. 1) may further include one or more threaded bracing rods 22 extending therebetween, each rod 22 having an adjusting nut 23 at each end thereon for maintaining tension on cross braces 18.

Referring now more particularly to FIG. 2, the inner mechanism 24 which forms the inventive features of my invention is shown as removed from frame member 11. It is noted that portions of cross braces 18 are shown for reasons to be discussed further hereinbelow. Mechanism 24 is a vibration and impact shock-absorbing mechanism which includes means for transmitting vibrations from the vibrating mechanism mounted on the outer frame member to mechanism 24.

Thus, mechanism 24 includes a pair of lever assemblies 25 and 26 with assembly 25 being preferably disposed on one side of frame member 11 (e.g., along side 14) and the other assembly 26 being disposed along the other side of frame member 11 (i.e., along side 15). Each assembly 25 and 26 includes a pair of upright levers (bars 27 and 28 on assembly 25 and bars 29 and 30 on assembly 26). The length of bars 27 through 30 is generally related to the height of sides 12 through 15. A pair of lever brace members 31 and 32 interconnect each pair of levers 27 through 30 at about their midpoints. A pair of resistance assemblies 33 and 34 interconnect each pair of levers 27 through 30 at their upper ends. This interconnection is provided at pivotable bearing points 34a and 34b for assembly 34. These assemblies 33 and 34 are shown as generally triangular in configuration but may of course take any convenient shape. However, each assembly 33 and 34 includes a centrally located coil spring housing 35 and 36, respectively (i.e., at the center of the triangular assemblies 33 and 34). Each housing 35 and 36 is broken away in FIG. 7 to show a pair of coil springs in each housing (i.e., springs 37 and 38 in housing 35 and springs 39 and 40 in housing 36). Of course, any convenient number or type of spring may be used. These springs 37 through 40 are preferably loosely mounted in their respective housings (i.e., retained therein by the walls of the housing) and abut against a pair of plates 41 and 42 (plate 41 in housing 35 and plate 42 in housing 36). These plates 41 and 42 are slidable within their respective housings and are connected to rods 43 and 44, respectively, which pass through suitable apertures in the front plates 45 and 46 of housings 35 and 36, respectively. Rods 43 and 44 then pass through like apertures in cross braces 18, which of course form part of outer frame member 11. These rods 43 and 44 are secured to braces 18 by means of suitable nuts 47 and 48 or the like.

As can best be seen in FIG. 3, any load or thrust placed on outer frame member 11, as indicated by arrows 49, is transmitted to lever assembly 25 by means of a plurality of plates integral with frame member 11. The other side of frame member 11 operates in the same manner and is omitted for convenience of illustration. Thus, as shown a pair of plates 50 and 51 (see also FIG. 2) are formed integral with frame member 11 internally of sides 12 and 13 (i.e., plates 50 and 51 extend from short side 14 internally of frame member 11 and are spaced from long sides 12 and 13, only a portion of plates 50 and 51 being visible in FIG. 2). Like plates (see FIG. 2) are disposed on the side 15 of frame member 11. These plates are pivotally connected to their respective lever assemblies 25 and 26 through suitable means (e.g., bearing means 52 and 53). I prefer to use conventional floating bearings so that my device 10 is self-aligning.

Each leg 19 comprises a foot assembly 54 which is best seen in FIG. 3, the assembly for each leg 19 being identical. These foot assemblies 54 include an upright portion 55 connected to a foot portion 56, thus forming leg 19. Pads 21 are of course fixed to the underside of foot portion 56. Upright portions 55 in turn pass through suitable apertures in flange portions 57 (see also FIG. 2) and are bolted thereto by suitable nuts 58 on each side thereof. Flange portions 57 are in turn rigidly secured to transverse bars 59, as by welding or the like (see particularly FIG. 2). These bars 59 extend parallel to short sides 14, 15 as shown in FIG. 2.

The free ends of both bars 59 are pivotally connected to a pair of linkages 60 and 61 by suitable bearing means 62, which pass through suitable apertures in both linkages 60 and 61. Linkages 60 are in turn pivotally secured to levers 27 through 30 at their lower ends by like bearing means 63. Linkages 60 are shorter than linkages 61 for reasons to be discussed further hereinbelow. Linkages 61 are in turn pivotally secured to a yoke member 64 at bearing means 65, the yoke member 64 having a shank portion 66 passing through suitable apertures in cross braces 67 which form part of frame member 11 (see also FIG. 1) and are thus below and generally parallel to cross braces 18. Shank portion 66 is bolted thereby by means of suitable nuts 68 or the like.

In order to assist in the installation of device 10, a plurality of roller means 69 are preferably provided at both ends of cross braces 67. These roller means 69 and the means for raising and lowering them relative to frame member 11 are shown in detail in FIG. 4, such means 69 not shown in FIGS. 2 and 3 for convenience of illustration. Each roller means 69 includes a pair of rollers 70 disposed on each side of a U-shaped bracket member 71. Suitable lock washers 72 are used to pivotally secure rollers 70 to a shaft 73 passing through suitable apertures in bracket member 71. Shaft 73 also passes through suitable apertures in a brace 74 extending between each roller means 69 (see particularly FIG. 5). Bracket member 71 includes a yoke portion 75 at its other end having cross brace 67 pivotally secured therebetween by means of a shaft 76 and lock washers 77 as shown.

An actuating rod 78 extends between each pair of roller means 69 (i.e., between cross braces 67 and generally parallel to long sides 12 and 13). Rod 78 includes a shaft 79 integral therewith at each end thereof which passes through suitable apertures in bracket member 71. A pair of downwardly depending flange members 80 are secured to side 12 (only one such set of flange members 80 being necessary to carry out my invention) generally at the center thereof. A hexagonal nut 81 is preferably secured between flange members 80 and includes a bolt 82 passing through suitable apertures in flange members 80 and is fixedly secured therein by any suitable means (e.g., by means of nut 83).

A threaded shaft 84 extends through and generally normal to nut 81. One end of shaft 84 threads into a threaded aperture 85 formed in rod 78. The opposite end of shaft 84 passes through a suitable aperture in nut 81 and the bolt head 86 thereof is thus accessible outside of frame member 11. By selectively turning bolt head 86, the attached roller means 69 can be raised and lowered relative to frame member 11. The length of bracket members 71 is preselected so that in its fully extended position rollers 70 are below the foot portions 56 of legs 19; in their fully retracted position, the bracket members 71 and of course roller means 69 are disengaged from floor 20 and thus inoperative relative thereto. In this manner, my device 10 can be rolled into position with its load thereon, then bolt head 86 turned to raise roller means 69 until legs 19 engage floor 20 and thus support the entire weight of device 10 and its accompanying load.

In order to assure a uniform and stable vertical movement on my device without lateral sway or rocking action, a plurality of cross linkages 87 through 90 are provided.

Thus, one linkage 87 crosses linkage 88 while linkage 89 crosses linkage 90, all of the linkages 87 through 90 being generally parallel to long sides 12 and 13 on each side of inner mechanism 24. These cross linkages 87 through 90 are pivotally connected to lever assemblies 25, 26 (FIGS. 2 and 3) at levers 27 through 30 as shown. All of the cross linkages 87 through 90 preferably include turnbuckle means 91 (not shown in detail in FIGS. 2 and 3 for convenience of illustration) for adjusting the tension of linkages 87 through 90.

Turnbuckle means 91 is illustrated in detail in FIG. 6. Each means 91 includes a nut 92 having a yoke portion 93 for receiving one end of the linkage (e.g., linkage portion 87' of linkage 87) therebetween. A shaft 94 extends through suitable apertures in both yoke portion 93 and linkage 87 for pivotally securing the linkage 87 therein with suitable lock washers 95 as shown. Nut 92 includes an integral threaded shaft 96 extending normal thereto which passes through a suitable aperture in one end of turnbuckle 97. The other end of turnbuckle 97 also includes a suitable aperture having a threaded shaft 98 extending therethrough integral with a nut 99 similar to nut 92 which also has a yoke portion 100 for retaining therein linkage portion 87" of linkage 87 and retained therein by shaft 101 and washers 102. A jam nut 103 is threaded onto shaft 98 between nut 99 and turnbuckle 97.

As discussed hereinabove, similar turnbuckle means 91 may be provided on the remaining cross linkages 88 through 90. Thus, the tension of linkages 87 through 90 may be quickly adjusted by turning turnbuckles 97 and jam nut 103. In this manner, a taut pull on linkages 87 through 90 may be maintained at all times.

In operation, the vibrating mechanism it is desired to support, for example, the washer-dryer combination discussed hereinabove, is placed on device 10 resting on pads 17 while roller means 69 are in their lowermost position after tightening turnbuckles 97. The entire apparatus is then rolled on rollers 70 to its desired location. Bolt head 86 is then cranked to raise roller means 69 until the device 10 rests on floor 20 supported by legs 19 as can be seen in FIG. 3. Foot assemblies 54 pivot about bearing means 62 until the apparatus is supported in a level position on floor 20.

Upon actuation of the vibrating mechanism, a load or thrust is placed on the frame member 11 as indicated by arrows 49. Any thrust or movement thereon is transmitted to the lever assemblies 25, 26 through pivotal bearing means 52, 53. As indicated, the foot assemblies 54, through linkages 60, are pivotally attached to the lever assemblies 25, 26 at bearing means 63. These assemblies 54 are also pivotally attached to frame member 11 by means of linkages 61 at both bearing means 62 and 65 (which latter bearing means 65 is in turn connected to cross braces 67 of frame member 11). Bearing means 62 is thus a common pivotal bearing point for both linkages 60 and 61 with respect to foot assemblies 54.

These foot assemblies 54, when resting on solid flooring, offer resistance to any downward thrust or motion of the load-carrying frame member 11 and the lever assemblies 25, 26. Linkages 61, being attached to frame member 11 at pivotable bearing means 65, move downwardly at bearing means 65 when frame member 11 moves downwardly under thrust of its load. The other end of linkages 61, being affixed to foot assemblies 54 at pivotable bearing means 62, acts as a fixed center.

Linkages 60, being affixed to foot assemblies 54 at pivotable bearing means 62, also act as a fixed center allowing linkages 60 to move downwardly at pivotable bearing means 63 when a downward thrust or motion is made on frame member 11.

When such downward motion or movement occurs through the load-carrying frame member 11 and lever assemblies 25, 26, the short linkages 60 move downward also at bearing point or means 63, but must also move in a radius or arc from the fixed center point (i.e., bearing point or means 62). In moving through this arc, the pivotable lever assemblies 25, 26, as they are forced downwardly with the thrust or load on frame member 11, are also pulled inwardly as they follow the arc of linkages 60.

The resistance assemblies 33, 34, fastened at one end to the load-carrying frame member 11 at cross braces 18, and at their other ends to levers 27 through 30 at pivot points 33a, 33b and 34a, 34b, respectively, tend to oppose or resist the pivotable inward pull of the levers 27 through 30 each time a load or thrust is applied. This resistance may be adjusted by selectively increasing or decreasing the spring tension in the spring housings 35 and 36 as desired. A limited amount of vertical motion is necessary so that vibration and impact may be absorbed by my device 10.

As discussed previously, in order to assure a uniform and stable vertical movement without lateral sway or rocking action, cross linkages 87 through 90 are provided. Any pivotal movement on the part of one of the lever assemblies 25, 26 (i.e., on only one side of my frame member 11) due to unequal thrust or impact on that side will, through cross linkages 87 through 90, impart an equal amount of the thrust load on the opposite lever assembly, thus allowing the device 10 to drop or rise in a parallel plane at all times.

These forces on my device 10 before and after installation of a vibratory device thereon are schematically illustrated in FIG. 7. As can be seen, the primed numerals refer to the respective positions of each corresponding element described hereinabove with the device 10 free-standing and no load placed thereon (e.g., approximately 50 pounds). The double primed numerals refer to an equipment load of approximately 325 pounds (relative to the approximate weight of a conventional washer-dryer combination, e.g.). The triple primed numerals refer to a maximum impact or thrust due to operation of the equipment of approximately 370 pounds. The arcuate movement of short linkages 60 and long linkages 61 during each respective load is indicated by lines a, b and c, respectively.

It can be seen from the foregoing that a novel vibration-dampening device has been described which, when placed as a base underneath any vibrating and/or impact shock-producing equipment, absorbs and cushions those vibrations and impact thrusts in such a manner as to prevent the transmittal of noise caused by those vibrations and impact shocks through to the floor and into nearby areas in the vicinity of the machine, especially in areas immediately below the floor or base holding the machinery. When such machinery is placed on the device of my invention, regardless of whether the machinery is balanced or off center in weight characteristics, the device will compensate for such features, keeping both the device and the machinery level with the floor. All vibration and movement of the machinery while on the device is converted to a vertical up-and-down motion in such a manner as to eliminate side sway or rocking motion.

EXAMPLE

Sound transmission tests were conducted using an upstairs and downstairs apartment unit. A combination washer-dryer was used as the source noise or sound transmitter. For the first phase of the testing procedure, the combination washer-dryer was placed on the floor in the bathroom area of the upstairs apartment in a normal installation. The testing (sound) engineer made all tests in the bathroom directly below the installation, i.e., in the downstairs apartment.

Four washing cycles were measured (i.e., fill, wash, rinse, spin) at frequency ranges from 125 cycles per second (c.p.s.) through 4,000 cycles per second. The noise (sound) measured in decibels by the sound meter was recorded at 125 c.p.s., 250 c.p.s., 500 c.p.s., 1,000 c.p.s., 2,000 c.p.s. and 4,000 c.p.s. through each cycle.

After the four cycles were run and tests made, the combination washer-dryer was lifted off the floor and the device 10 described hereinabove was placed on the floor and the washer-dryer unit was then placed down on the device 10.

The four operating cycles of the washer-dryer were then rerun and measured as before by the sound engineer. The results of both tests were then transposed into the graph of FIG. 7 for a better visual analysis.

In making the analysis of the sound transmission, the sound made during the rinse cycle was produced in part by the sound of the water rushing down the vertical wall in the room where the sound instrument was used. So the rinse cycle was deleted in making the analysis of the effectiveness of the device 10.

The graph shows a smooth, even graph line throughout the frequency sound range indicating that the device 10 worked effectively at all noise or sound levels. The X's, circles, triangles and squares plotted on the upper portion of the graph represent the rinse, fill, wash and spin cycles, respectively, of the combination washer-dryer without the installation of my device 10. The X's, circles, triangles and squares on the lower portion of the graph represent in like manner the respective cycles of the washer-dryer after installation of my device 10. The ordinate axis is plotted in decibels and the abscissa axis in cycles per second. Thus, a significant reduction in noise is clearly shown.

The reduction in the noise or sound level recorded showed an average decibel loss of 13 decibels. At the sound level recorded, this represents a reduction of approximately 85–90% of the intensity of the sound.

A personal listening test measuring the sound changes and intensities with the human ear was also run with results as follows. When the washer-dryer combination was operated with normal installation (directly sitting on floor), the noise level in the apartment below was loud enough to be heard clearly in all rooms of the apartment and could be considered objectionable. When the washer-dryer combination was installed on top of the device 10 and operated, the sound could be heard faintly directly below but not loud enough to be classified as objectionable and, in the other rooms of the apartment below, the sound could not be distinguished from other background noises such as the refrigeraator, fans, outside noises, etc.

Approximately 80 such devices 10 have been installed in upstairs apartments in a particular development. Since these installations were put in, there have been no registered complaints from residents living in the apartments below these installations.

I claim as my invention:

1. A vibration-dampening device comprising:
    an outer frame member adapted to support a vibrating mechanism associated therewith; and
    an inner leveling vibration and impact shock-absorbing mechanism associated with said outer frame member for absorbing vibration and impact on said frame member, said shock-absorbing mechanism including means for transmitting vibration from the vibrating mechanism associated with said outer frame member to said shock-absorbing mechanism, said means for transmitting vibration comprising a pair of lever assemblies disposed internally of said frame and on opposite sides thereof, each of said lever assemblies including a pair of interconnected upright levers pivotally connected to said frame and a resistance assembly pivotally interconnected to each pair of levers at their upper ends thereof, each of said resistance assemblies including at least one spring housing having spring means therein, said spring means being retained within said housing with each of said housings further including slidable plate means therein for compressing said springs, each of said plates including a shaft extending out of said housing and fixedly connected to said frame via a pair of cross braces fixedly connected to opposite sides of said frame.

2. The device of claim 1 wherein said outer frame member includes a generally rectangular frame having four sides forming said frame and means associated with said frame for supporting said vibrating mechanism on top of said frame.

3. The device of claim 2 wherein said spring means includes at least a pair of coil springs disposed in each of said housings.

4. The device of claim 2 including a pair of foot means associated with each of said lever assemblies for supporting said frame in a generally level position on a floor or the like, each of said foot means including a pair of upright foot portions on opposite sides of said frame having a base on one end adapted to rest on the floor and a pair of linkages pivotally connected to each of said foot portions at their upper ends, the free ends of one of said linkages being pivotally connected to said frame via a cross brace fixedly connected to opposite sides of said frame and the free ends of the other of said linkages being pivotally connected to the lower ends of said upright levers.

5. The device of claim 4 wherein the linkages pivotally connected to said levers are shorter than the linkages pivotally connected to said frame.

6. The device of claim 4 including roller means connected to said frame for rolling said frame along said floor, said roller means including means associated therewith for selectively moving said roller means from a first position in rolling engagement with said floor and below the lowermost portion of said bases of said foot portions to a second position above the lowermost portion of said bases of said foot portions and out of rolling engagement with said floor.

7. The device of claim 2 including adjusting means associated with each of said lever assemblies for adjusting the tension therebetween.

8. The device of claim 7 wherein said adjusting means includes a plurality of cross linkages associated with said lever assemblies, each of said cross linkages being pivotally connected at one end to the upper portion of the upright levers of one of said lever assemblies and at their other ends to the lower portions of the upright levers of the other of said lever assemblies disposed opposite said first-mentioned levers.

9. The device of claim 8 including adjusting means associated with each of said cross linkages for maintaining a taut pull on each of said cross linkages.

10. A vibration-dampening device comprising:
    an outer frame member adapted to support a vibrating mechanism thereon, said outer frame member including a generally rectangular frame having four sides forming said frame and means associated with said frame for supporting said vibrating mechanism on top of said frame, and
    an inner leveling vibration and impact shock-absorbing mechanism associated with said outer frame member for absorbing vibration and impact on said frame member, said shock-absorbing mechanism including means for transmitting vibration from the vibrating mechanism mounted on said outer frame member to said shock-absorbing mechanism, said means for transmitting vibration comprising a pair of lever assemblies disposed internally of said frame and on opposite sides thereof, each of said lever assemblies including a pair of interconnected upright levers pivotally connected to said frame and a resistance assembly pivotally interconnected to each pair of levers at their upper ends thereof, each of said resistance assemblies including a spring housing having spring means therein, said spring means being retained within said housing with each of said housings further including slidable plate means therein for compressing said springs, each of said plates including a shaft extending out of said housing and fixedly connected to said frame via a pair of cross braces fixedly connected to opposite sides of said frame.

References Cited

UNITED STATES PATENTS

| | | | |
|---|---|---|---|
| 2,704,196 | 3/1955 | Beach | 248—21 X |
| 2,428,285 | 9/1947 | Lea | 248—21 X |
| 2,692,681 | 10/1954 | Douglas | 248—21 X |
| 3,021,956 | 2/1962 | Bochan | 68—23.3 X |
| 2,173,982 | 9/1939 | Schettler | 108—136 X |
| 3,536,288 | 10/1970 | Rosenbaum | 248—399 |

FOREIGN PATENTS

| | | | |
|---|---|---|---|
| 957,425 | 5/1964 | Great Britain | 68—23.1 |
| 1,160,356 | 7/1958 | France | 68—23.1 |
| 70,900 | 9/1959 | France | 68—23.1 |

J. FRANKLIN FOSS, Primary Examiner

U.S. Cl. X.R.

68—23.1